(12) United States Patent
Yang

(10) Patent No.: US 9,868,483 B2
(45) Date of Patent: Jan. 16, 2018

(54) INTELLIGENT ANTI-THEFT DEVICE FOR BICYCLES

(71) Applicant: SHENZHEN SMART RIDING INTELLIGENCE TECHNOLOGY CO., LTD, Shenzhen (CN)

(72) Inventor: Dandan Yang, Shenzhen (CN)

(73) Assignee: SHENZHEN SMART RIDING INTELLIGENCE TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 15/507,136

(22) PCT Filed: May 19, 2015

(86) PCT No.: PCT/CN2015/079266
§ 371 (c)(1),
(2) Date: Feb. 27, 2017

(87) PCT Pub. No.: WO2016/058382
PCT Pub. Date: Apr. 21, 2016

(65) Prior Publication Data
US 2017/0274948 A1     Sep. 28, 2017

(30) Foreign Application Priority Data
Oct. 16, 2014  (CN) .......................... 2014 1 0547971

(51) Int. Cl.
*B60R 25/10* (2013.01)
*B62H 5/20* (2006.01)
*H04W 4/04* (2009.01)

(52) U.S. Cl.
CPC ................ *B62H 5/20* (2013.01); *H04W 4/04* (2013.01)

(58) Field of Classification Search
CPC ..................................... B60L 1/00; H02J 1/00
See application file for complete search history.

(56) References Cited

U.S. PATENT DOCUMENTS

| 2014/0000322 A1* | 1/2014 | Williams | ............ E05B 73/0011 70/18 |
| 2016/0059918 A1* | 3/2016 | Hensley | .................... B62H 5/20 70/233 |

FOREIGN PATENT DOCUMENTS

| CN | 2257565 | 7/1997 |
| CN | 201405959 | 2/2010 |

(Continued)

OTHER PUBLICATIONS

International Search Report (English and Chinese) and Written Opinion of International Application No. PCT/CN2015/079266, dated Aug. 26, 2015, total 10 pages.

*Primary Examiner* — Shirley Lu
(74) *Attorney, Agent, or Firm* — Hamre, Schumann, Mueller & Larson, P.C.

(57) ABSTRACT

The present invention relates to an intelligent anti-theft device for bicycles, where the device includes a bolt, an expansion sheet, a hollow tube, a micro central processing unit, and a battery; the bolt is a hollow structure; the bolt includes a bolt head and a screw rod, an upper cover plate of the bolt head being in an openable connection with a bolt head body, and the communication module and the antenna being provided within an internal of the bolt head body; the bolt is in a threaded connection to a front cover of the hollow tube; the expansion sheet is provided between the bolt and a front end of the hollow tube; the truncated cone is provided between the expansion sheet and the bolt head; the micro central processing unit and the battery are provided within an internal of the hollow tube, the micro central processing unit being electrically connected to the battery, the communication module being electrically connected to the antenna, and the micro central processing unit being electrically connected to the communication module; and a rear end of the hollow tube is provided with a bottom cover. The present (Continued)

invention belongs to the technical field of electronic products. An object of the present invention is proving an intelligent anti-theft device for bicycles which having functions of real-time anti-theft and real-time information sharing after being stolen.

10 Claims, 2 Drawing Sheets

(56) References Cited

FOREIGN PATENT DOCUMENTS

| | | |
|---|---|---|
| CN | 104260805 | 1/2015 |
| CN | 204197113 | 3/2015 |
| EP | 0189147 | 7/1986 |
| GB | 2484273 | 4/2012 |

\* cited by examiner

INTELLIGENT ANTI-THEFT DEVICE FOR BICYCLES

BACKGROUND

Field of the Invention

The present utility model relates to an intelligent anti-theft device, and in particular to an intelligent anti-theft device for bicycles.

Background of the Invention

As people pay more emphasis on the environment, drivers become more interested in low-carbon and green travels, and even in some cities, people go to work by bikes rather than the earlier tools such as cars. However, in most cases, problems may occur to security about bicycle placing when going out by a bicycle. For example, a common problem is that the bicycle is stolen.

Most of the existing bicycle antitheft uses an anti-theft lock. However, in actual conditions, an adoption of this kind of anti-theft locks cannot actually have an anti-theft function, and the manner is too single and is inconvenient. It is expected to have an intelligent anti-theft device which can resolve matters about bicycle anti-theft, and can also achieve functions of providing a track, counting a motion amount, as well as social functions based on the intelligent anti-theft device, such as transmitting relevant sharing and comments about pictures, videos, texts, and voice.

SUMMARY

An object of the present utility model is providing an intelligent anti-theft device for bicycles which can prevent the bicycle from being stolen, and can accurately provide, in time, a movement track and real-time surrounding information after the bicycle is stolen.

An intelligent anti-theft device for bicycles, where the device includes a bolt, a communication module, an antenna, an expansion sheet, a hollow tube, a truncated cone, a micro central processing unit, and a battery; the bolt is a hollow structure; the bolt includes a bolt head and a screw rod, an upper cover plate of the bolt head being in an openable connection with a bolt head body, and the communication module and the antenna being provided within an internal of the bolt head body; the bolt is in a threaded connection to a front cover of the hollow tube; the expansion sheet is provided between the bolt and a front end of the hollow tube; the truncated cone is provided between the expansion sheet and the bolt head; the micro central processing unit and the battery are provided within an internal of the hollow tube, the micro central processing unit being electrically connected to the battery, the communication module being electrically connected to the antenna, and the micro central processing unit being electrically connected to the communication module; and a rear end of the hollow tube is provided with a bottom cover.

Further, a center of the front cover of the hollow tube is provided with a through hole, where the through hole is provided with an inner thread; the front cover is connected to an outer thread of the hollow tube; the front cover is connected to the bolt by using the inner thread of the through hole; and one end of the through hole is provided with a baffle plate.

Further, a nut is provided between the expansion sheet and the front cover of the hollow tube, where a middle portion of the nut is provided with the through hole; and the through hole of the nut is provided with threads.

Further, the bolt head at least is provided with an USB interface.

Further, the bolt head at least is provided with a waterproof cover.

Further, an external of the bolt is provided with a waterproof cover which is made of an insulating material.

Further, the internal of the hollow tube is provided with a first cavity and second cavity, where the micro central processing unit is provided within the first cavity; the battery is provided within the second cavity; and the microprocessor is electrically connected to the battery.

Further, the upper cover plate of the bolt is made of an insulating material.

Furthermore, the insulating material is a non-metallic material.

Furthermore, the insulating material is a plastic.

Beneficial effects of using the foregoing technical solutions are: First, an intelligent anti-theft function is owned. For example, if a vehicle is in a stolen state, a user may view a location and a motion track of the vehicle by using a smartphone. Subsequently, the device of the present utility model has a uniquely designed structure, reasonably uses an existing structural relationship in bicycles, and is very simple and convenient to be assembled with the bicycles.

In the accompanying drawings, a list of components represented by reference signs is as follows: 1—bolt, 10—bolt head, 101—upper cover plate, 11—screw rod, 12—communication module, 2—expansion sheet, 3—hollow tube, 30—micro central processing unit, 31—battery, 4—truncated cone, 5—nut, 6—waterproof cover, 32—front cover, 33—bottom cover, 7—bicycle, and 8—intelligent anti-theft device.

DETAILED DESCRIPTION

Content of the present utility model is further described below with reference to the accompanying drawings and preferable specific embodiments of the present utility model. The given examples are merely used to explain the present utility model, but are not intended to limit the scope of the present utility model.

Figure 1:
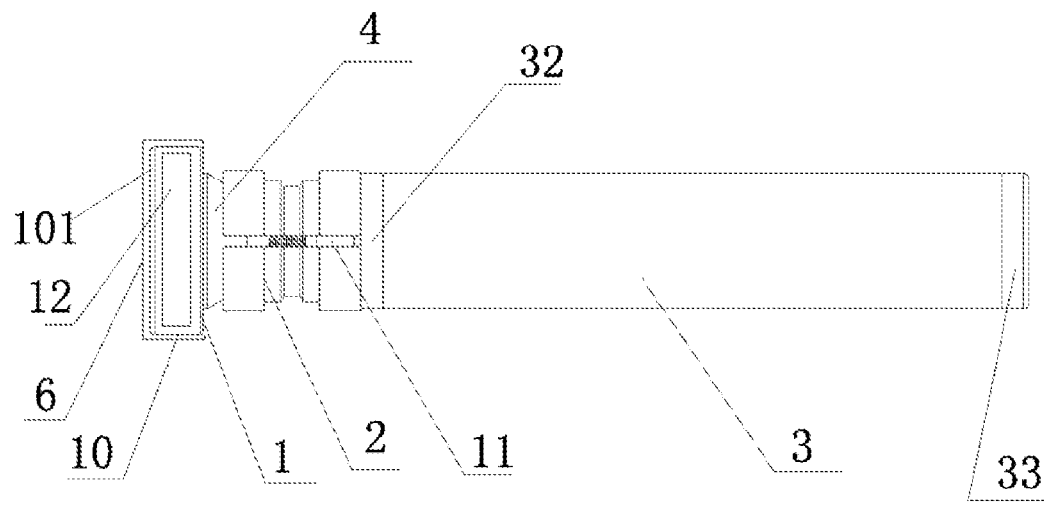
FIG. 1 is a schematic diagram of an entire structure of the present utility model.
Figure 2:
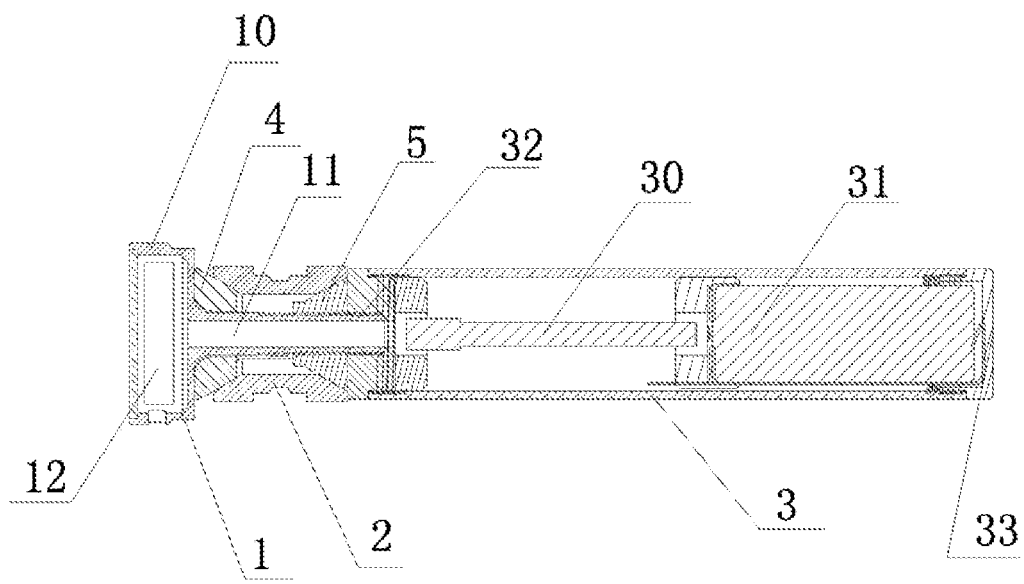
FIG. 2 is a schematic diagram of a cross-sectional structure of the present utility model.

As shown in FIG. 1 and FIG. 2, an intelligent anti-theft device for bicycles in this solution is provided. The device includes a bolt 1, a communication module 12, an antenna, an expansion sheet 2, a hollow tube 3, a truncated cone 4, a micro central processing unit 30, and a battery 31. The bolt 1 is a hollow structure. The bolt 1 includes a bolt head 10 and a screw rod 11. An upper cover plate 101 of the bolt head 10 is in an openable connection with a bolt head body. The communication module 12 and the antenna are provided within an internal of the bolt head body. In this solution, the bolt head 10 at least is provided with an USB interface which is a mark interface. To avoid rain entering the bolt head 10, in this solution, an external of the bolt head 10 is provided with a waterproof cover 6. To avoid the communication module 12 and the antenna provided within the bolt head 10 cannot operate normally because a metal material is used, in this solution, the waterproof cover 6 and the upper cover plate 101 of the bolt head 10 are made of an insulating material. In this solution, the insulating material is a non-metallic material or a plastic; and the bolt 1 is in a threaded connection to a front cover 32 of the hollow tube 3. Specifically, in this solution, a center of the front cover 32 of the hollow tube 3 is provided with a through hole, the through hole being provided with an inner thread; the front cover 32 is connected to an outer thread of the hollow tube 3; the front cover 32 is connected to the bolt by using the inner thread of the through hole; and one end of the through hole is provided with a baffle plate. A function of the baffle plate is preventing the screw rod 11 of the hollow bolt 1 from passing through the front cover 32 of the hollow tube 3 to enable the bolt 1, by using the screw rod 11, to be screwed with the hollow tube 3 to form an integral structure. In this solution, the expansion sheet 2 is provided between the bolt 1 and a front end of the hollow tube 3. Further, in this solution, a nut is provided between the expansion sheet 2 and the front cover 32 of the hollow tube 3; a middle portion of the nut is provided with the through hole; the through hole of the nut is provided with threads; the truncated cone 4 is provided between the expansion sheet 2 and the bolt head 10; the micro central processing unit 30 and the battery 31 are provided within an internal of the hollow tube 3, the micro central processing unit 30 being electrically connected to the battery 31, the communication module 12 being electrically connected to the antenna, and the micro central processing unit 30 being electrically connected to the communication module 12; and a rear end of the hollow tube 3 is provided with a bottom cover 33. In this solution, to better ensure battery life of the product, the internal of the hollow tube 3 is provided with a first cavity and second cavity; the micro central processing unit 30 is provided within the first cavity; the battery 31 is provided within the second cavity; and the micro central processing unit 30 is electrically connected to the battery 31.

Figure 3:
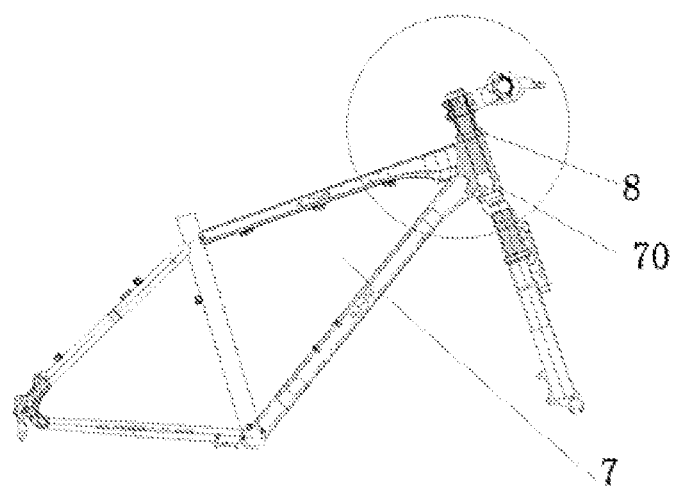
FIG. 3 is a schematic diagram of a structure section at which the present utility model is combined with a bicycle.
Figure 4:
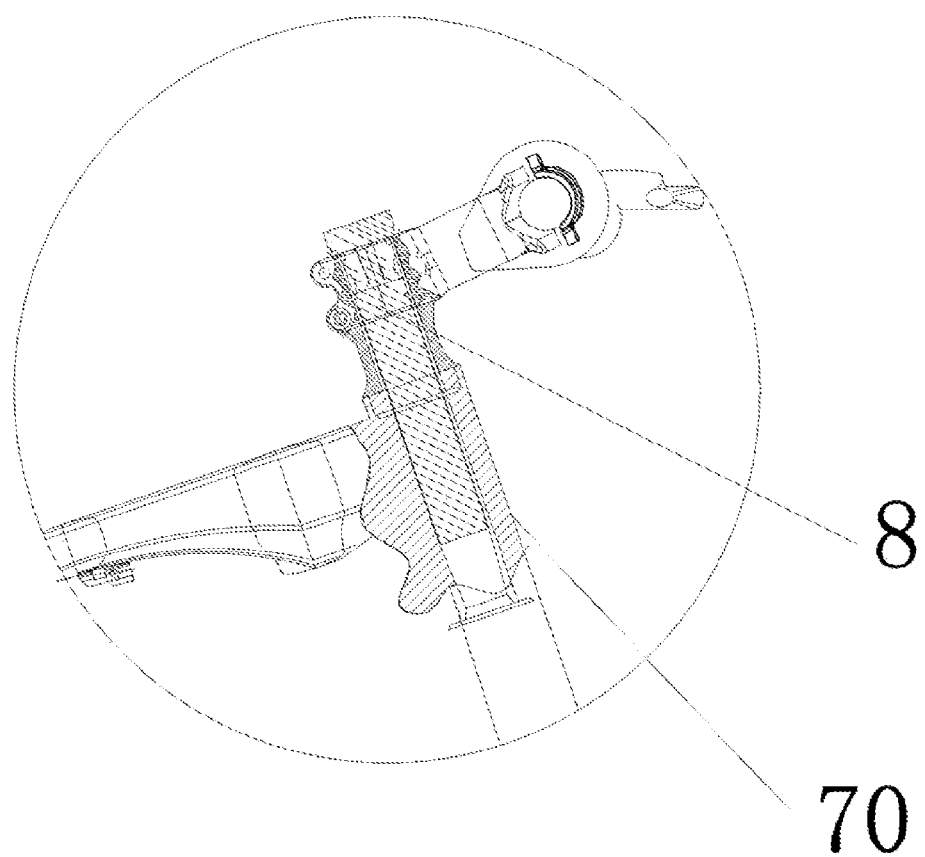
FIG. 4 is an enlarged schematic diagram of a structure section at which the present utility model is combined with a bicycle.

As shown in FIG. 3 and FIG. 4, the intelligent anti-theft device for bicycles 8 in this solution is provided at a juncture of a forepart (a head tube) (70) at the front end of the bicycle and a handlebar, and has a function of replacing this part of a bicycle 7 which has an expansion screw structure.

In specific implementations, a user only needs to simply assemble the intelligent anti-theft device for bicycles 8 in the present utility model with a bicycle. The device in the utility model is provided with an expansion sheet 2, and in the present utility model, the expansion sheet 2 may also be generally called as an expansion screw. When the device of the present utility model is provided at a corresponding position on the bicycle, the user only needs to screw the bolt 1 on the intelligent anti-theft device for bicycles in the present utility model, thereby facilitating, under the function of the expansion sheet 2, the intelligent anti-theft device for bicycles to be connected to the bicycle in an engagement manner. Subsequently, the intelligent anti-theft device for bicycles can initiate, using a system provided within the intelligent anti-theft device for bicycles, an anti-theft function after authenticating and communicating with a phone of the user. When the user is a certain distance away from the bicycle, the bicycle has a positional movement. Moreover, when the movement lasts for a period of time, the intelligent anti-theft device notifies the user by means of a phone or a short message service. Therefore, a good intelligent anti-theft function is achieved. Moreover, assembling of this product and the bicycle is also ingenious, so that there is no need to worry about that the product may be easily disassembled from the bicycle, so as to achieve the effects of security and reliability.

The foregoing descriptions are merely exemplary embodiments of the present utility model, but are not intended to limit the present utility model. Any modification, equivalent replacement, and improvement made without departing from the spirit and principle of the present utility model shall fall within the protection scope of the present utility model.

What is claimed is:

1. An intelligent anti-theft device for bicycles, wherein: the device comprises a bolt, a communication module, an antenna, an expansion sheet, a hollow tube, a truncated cone, a micro central processing unit, and a battery; the bolt is a hollow structure; the bolt comprises a bolt head and a screw rod, an upper cover plate of the bolt head being in an openable connection with a bolt head body, and the communication module and the antenna being provided within an internal of the bolt head body; the bolt is in a threaded connection to a front cover of the hollow tube; the expansion sheet is provided between the bolt and a front end of the hollow tube; the truncated cone is provided between the expansion sheet and the bolt head; the micro central processing unit and the battery are provided within an internal of the hollow tube, the micro central processing unit being electrically connected to the battery, the communication module being electrically connected to the antenna, and the micro central processing unit being electrically connected to the communication module; and a rear end of the hollow tube is provided with a bottom cover.

2. The intelligent anti-theft device for bicycles according to claim 1, wherein: a center of the front cover of the hollow tube is provided with a through hole, the through hole being provided with an inner thread; the front cover is connected to an outer thread of the hollow tube; the front cover is connected to the bolt by using the inner thread of the through hole; and one end of the through hole is provided with a baffle plate.

3. The intelligent anti-theft device for bicycles according to claim 1, wherein: a nut is provided between the expansion sheet and the front cover of the hollow tube; a middle portion of the nut is provided with the through hole; and the through hole of the nut is provided with threads.

4. The intelligent anti-theft device for bicycles according to claim 1, wherein: the bolt head at least is provided with an USB interface.

5. The intelligent anti-theft device for bicycles according to claim 1, wherein: the bolt head at least is provided with a waterproof cover.

6. The intelligent anti-theft device for bicycles according to claim 5, wherein: the waterproof cover is made of an insulating material.

7. The intelligent anti-theft device for bicycles according to claim 1, wherein: the internal of the hollow tube is provided with a first cavity and second cavity; the micro central processing unit is provided within the first cavity; the battery is provided within the second cavity; and the micro central processing unit is electrically connected to the battery.

8. The intelligent anti-theft device for bicycles according to claim 1, wherein: the upper cover plate of the bolt is made of an insulating material.

9. The intelligent anti-theft device for bicycles according to claim 6, wherein: the insulating material is a non-metallic material.

10. The intelligent anti-theft device for bicycles according to claim 6, wherein: the insulating material is a plastic.

* * * * *